(12) United States Patent
Booth et al.

(10) Patent No.: US 6,424,768 B1
(45) Date of Patent: Jul. 23, 2002

(54) CABLE

(75) Inventors: David Booth, Pleinfeld; Herbert Grunsteudel, Dittenheim, both of (DE); Michael Hoffmann, Tamins (CH); John David Smith, Cedar Creek, TX (US)

(73) Assignees: W. L. Gore & Associates, Inc., Newark, DE (US); W. L. Gore & Associates, GmbH, Putzbrunn (DE)

( * ) Notice: Subject to any disclaimer, the term of this patent is extended or adjusted under 35 U.S.C. 154(b) by 0 days.

(21) Appl. No.: 09/423,152

(22) PCT Filed: Mar. 2, 1999

(86) PCT No.: PCT/IB99/00449

§ 371 (c)(1),
(2), (4) Date: Feb. 7, 1999

(87) PCT Pub. No.: WO99/45548

PCT Pub. Date: Sep. 10, 1999

(30) Foreign Application Priority Data

Mar. 2, 1998 (GB) .............................................. 9804415

(51) Int. Cl.[7] .................................................. G02B 6/44
(52) U.S. Cl. ...................... 385/102; 385/101; 385/103; 385/104; 385/106; 174/116
(58) Field of Search ................................... 385/101, 102, 385/103, 104, 106; 174/116, 96, 98

(56) References Cited

U.S. PATENT DOCUMENTS

| | | | |
|---|---|---|---|
| 3,517,110 A | 6/1970 | Morgan | |
| 4,191,448 A | 3/1980 | Dean et al. | |
| 4,196,307 A | 4/1980 | Moore et al. | |
| 4,600,268 A | * 7/1986 | Spicer | 385/103 |
| 4,634,217 A | * 1/1987 | Levacher | 385/102 |
| 4,737,012 A | * 4/1988 | Murakami | 385/102 |
| 4,932,746 A | * 6/1990 | Calzolari | 385/112 |
| 5,007,703 A | * 4/1991 | Hale | 385/102 |
| 5,267,338 A | * 11/1993 | Bullock | 385/100 |
| 5,539,849 A | * 7/1996 | Petisce | 385/102 |
| 5,636,308 A | * 6/1997 | Personne | 385/102 |

FOREIGN PATENT DOCUMENTS

| | | |
|---|---|---|
| EP | 0 193 780 | 9/1986 |
| FR | 2 678 368 | 12/1992 |
| GB | 291625 | 6/1928 |
| GB | 339104 | 12/1930 |
| GB | 574753 | 1/1946 |
| WO | WO 83/00564 | 2/1983 |

* cited by examiner

Primary Examiner—Cassandra Spyrou
Assistant Examiner—Leo Boutsikaris
(74) Attorney, Agent, or Firm—Allan M. Wheatcraft

(57) ABSTRACT

A cable comprising a stress-bearing matrix extending substantially through the length of the cable; and a plurality of conducting elements extending substantially through the length of the cable, the plurality of said conducting elements being located within and spaced from one another by said stress-bearing matrix, wherein at least one of the plurality of conducting elements is in intimate contact with a low friction liner disposed about the at least one of the plurality of conducting elements and the at least one of the conducting elements is longitudinally movable relative to the stress-bearing matrix.

27 Claims, 4 Drawing Sheets

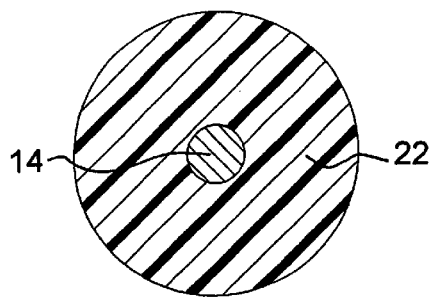
Fig. 3
Fig. 4
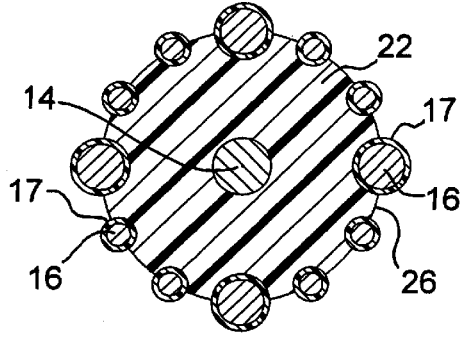
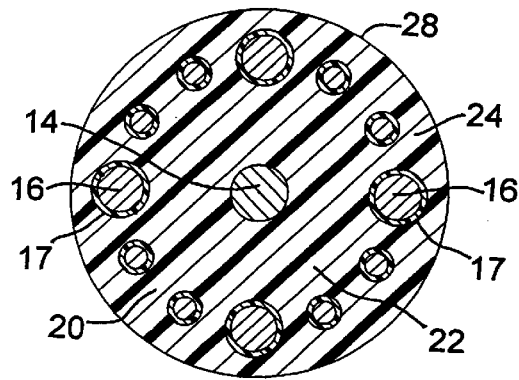
Fig. 5
Fig. 6
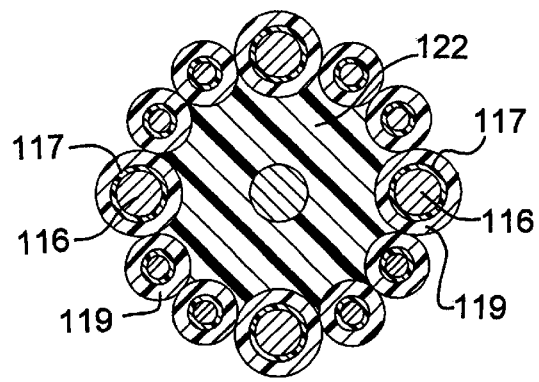
Fig. 7

CABLE

FILED OF THE INVENTION

This invention relates to cable and to the manufacture of cable. The invention has particular application in cable which is likely to be subject to flexing, radial compression and tensile and shear stresses. Embodiments of the invention are suited for use as ocean bottom cable (OBC).

BACKGROUND OF THE INVENTION

One method of surveying the geology of subsea strata involves laying long lengths (for example 50–60 km lengths) of sensing cable in a serpentine manner on the sea floor; the cable is generally know as ocean bottom cable (OBC). The cable will typically comprise a number of cable sections, for example a 57 km cable may comprise 150 cable sections each of 380 m length, each cable section carrying a number of sensors. Acoustic waves are created in the water above the cable, which waves are reflected at varying amplitudes and angles by the strata beneath the sea floor. The reflected waves are detected by the sensors and the resulting signal output is analysed to produce a seismorgraph of the subsurface geology of the area. This method of geological surveying is perhaps most commonly used in identifying subsea hydrocarbon-bearing formations with potential for oil or gas production.

The OBC is laid on the sea floor using a vessel equipped with an arrangement for deploying and retrieving the cable, known as a "linear traction wrench" or "squirter". Typically, the squirter comprises a plurality of pairs of driven wheels, often shod with vehicle tyres, each pair defining a "nip" or "pinch point" for engaging a section of cable. The vessel will follow a serpentine path over the area of sea floor to be surveyed, with the squirter deploying the cable at a corresponding rate. Once the survey has been completed the squirter is operated to retrieve the cable.

Conventional OBC comprises a central reinforcing fibre core, a plurality of elongate components, typically insulated conductors helically wound around the core, an extruded sheath, possible further braided fibre reinforcement, and an outer abrasion resistant protective sheath or jacket. When a section of the OBC passes through the squirter or is subjected to flexing, compressive and longitudinal forces are quickly transferred to the components and may, in time, result in damage to the components. The components of the cable, for example the reinforcing braid, may also shift position within the cable upon flexing. When the cable is next subjected to longitudinal stress, the displaced component may be subject to damage.

As the cable is deployed and retrieved, particularly in deep water, the weight and drag on the cable suspended from the squirter is considerable. Accordingly, the squirter must apply significant compressive and longitudinal forces to the cable. These forces are of course first applied to the exterior of the cable and are then transferred radially inward through the components of the cable to the central core. This may place significant stresses on individual components, increasing the possibility of component failure. One recognised failure mechanism is termed "Z-kinking", and involves a component being subject to longitudinal forces which stretch the component beyond its elastic limit or "yield point." When the forces are removed, the elongated component retracts and is folded back on itself, thereby damaging the component. Furthermore, the different components of the cable may behave differently under stress. For example, the overlying extruded sheath or jacket is likely to have greater elasticity than the adjacent layer of helically wound conductors, which may lead to the jacket extending longitudinally relative to the conductor layer. Where such extensions occur rapidly over short sections of cable, as at the squirter during sudden starts or stops or due to pitching and yawing of the vessel, the longitudinally flexing jacket may damage underlying components. Also, such displacement prevents the effective transfer of shear forces from the jacket to the reinforcing core. The sheath will then bear substantially all of the tension applied to the cable by the squirter, possibly leading to premature failure of the jacket and cable. Where the jacket has been pressure extruded over the conductor layer, the jacket's inner profile corresponds to the rope-like surface of the helically wound conductors, such that longitudinal displacement of the jacket relative to the conductor layer may impart considerable localized abrasions and loads upon the conductors. To avoid damage caused by inefficient load transfers as described above, the longitudinal force applied to the cable jacket is typically distributed over longer sections of cable by adding squirter nips. The compressive forces applied at the squirter nips are typically increased, and elaborate controls are sometimes employed to avoid jerking.

In exiting OBCs, it is common for voids to remain within the core of the cable. As a result, water pressure will often deform the cable as the atmospheric voids collapse and move within the cable, displacing individual elements within the cable and thus changing the electrical, optical, and\or mechanical characteristics of the elements or cable in general. Such displacements may increase rigidity in regions of the cable, for example, resulting in handling problems and increasing the likelihood of component damage when the cable is retrieved. Displaced air within the cable may also collect in pressurised pockets which breach the outer jacket on retrieval of the cable, allowing water to penetrate into the cable. To avoid problems associated with voids, cables have been filled with oil or other viscous materials with a view to flushing out any trapped air and filling any voids in the cable. Such methods, however, generally have other problems associated with them and are only partially effective. Complete air removal is difficult to achieve, particularly with higher viscosity materials, and lower viscosity fluids require special considerations for filling the cable and may reduce load transfers.

EP-A-0 193 780 discloses a submarine cable for optical fibre telecommunications. The cable has a core comprising armouring of antitorsional rope and a plurality of small tubes wound helically and in direct contact with the armouring. The small tubes loosely house the optical fibres and are filled with a practically incompressible fluid such as a petroleum jelly or a silicon grease.

It is among the objectives of embodiments of the present invention to provide an OBC which obviates or mitigates these difficulties.

It is a further objective of embodiments of the present invention to provide an improved cable containing a plurality of elements in which the elements are protected from stresses and forces applied to the cable.

SUMMARY OF THE INVENTION

According to the present invention there is provided a cable comprising: a stress-bearing matrix extending substantially through the length of the cable; and a plurality of conducting elements extending substantially through the length of the cable, the plurality of said conducting elements being located within the spaced from one another by said stress-bearing matrix, wherein at least one of the plurality of conducting elements is in intimate contact with a low friction liner disposed about the at least one of the plurality of conducting elements and the at least one of the conducting elements is longitudinally movable relative to the stress-bearing matrix.

In use, the provision of the low friction liner disposed about at least one of the conducting elements allows embodiments of the present invention to be designed such that loads are transferred to selected conducting elements at differing rates. This is particularly useful where the elements are fragile or susceptible to stress induced damage, for example optical fibres or small diameter electrical conductors. Further, the flexibility of the cable is improved as relatively inelastic elements, such as metallic conductors, may incur minimal loads over short lengths as the cable flexes. In contrast to the cable configuration disclosed in EP-A-0 193 780, in which optical fibres are loosely housed in tubes, the intimate contact between the conducting element and the liner of the present invention provides the cable with structural stability, that is the conducting element will not move laterally within the liner as the cable experiences stresses and strains; as noted above, displacing individual elements within a cable may change the electrical, optical, and\or mechanical characteristics of the elements or cable in general. Further, the elements and liners of the present invention are more compact, and thus a cable of a given diameter may accommodate a greater number of elements. In addition, locating a liner around an element in accordance with the present invention is likely to be easier, more reliable and thus less expensive than locating an element in a tube and completely filing the tube with a viscous incompressible fluid.

According to another aspect of the present invention there is provided a cable comprising a plurality of elongate conducting elements located within and spaced from one another by a stress-bearing matrix substantially throughout the length of the cable, the cable being non-rigid and bendable in multiple planes.

In use, when a longitudinal stress is applied to cables of embodiments of these aspects of the invention via the jacket of the cable, for example by a squirter arrangement for deploying or retrieving cable, shear forces applied to the outer surface of the jacket are transferred radially inwardly through the cable primarily via the matrix. The presence of the matrix material between individual elements significantly reduces the amount of shear forces transferred radially inwardly of the cable via load-sensitive elements, and instead facilitates concentration of said forces on selected load bearing elements within the cable. In testing it has been found that longitudinal forces applied externally to cables in accordance with embodiments of the present invention will transfer to specified load bearing elements within the cable at a rate in excess of ten times that of longitudinal forces applied to a comparable conventional cable. Subsequently, lower longitudinal forces are transferred to selected sensitive elements and at a greatly reduced rate. In addition, the presence of the matrix material surrounding the individual elements allows for more even distributions of compressive forces. Where the cable is utilised as an ocean bottom cable (OBC), these features allow much higher loads to be applied over much shorter squirter lengths than those required for conventional ocean bottom cables.

Preferably, the cable is round. Preferably also, the elements are helically wound, and most preferably the elements are wound around a central axis of the cable.

Preferably also, a plurality of elements are located within respective low friction liners. The low friction liner may be formed of a friction-reducing material, such as expanded polytetrafluoroethylene (ePTFE), to facilitate sliding movement of the element. Other materials which may be used include ethylene-propylene copolymer (EPC), polyester, polyethylene, and fluorocarbon or silicon based materials. Utilising a porous material, such as ePTFE, to form the liner also allows the matrix-forming material to penetrate into the porous structure to secure the liner to the matrix thereby helping to maintain the structural integrity of the liner. The low friction liner material may be tape-wrapped around the element or may be in the form of an extruded tube.

Preferably also, the matrix fills substantially all of the space between the elements, and is preferably substantially incompressible. This is useful in applications in which the cable experiences high external pressures, for example where the cable serves as ocean bottom cable (OBC). This feature is also useful in minimising the risk of damage or deformation of the cable on passing through a cable squirter or other arrangement defining a nip.

The elements may include one or more electrical conductors, one or more optical fibres, one or more force transmission members, and\or one or more fluid transmission conduits for conducting, for example, pressurised gases, hydraulic fluids, exhaust gases or cooling fluids. The electrical conductors may be of copper, silver, or aluminium or alloys containing these materials.

The electrical conductors may be insulated by any suitable material, such as ePTFE, ethylene-propylene co-polymer (EPC), polyester-based materials such as MIL-ENE® obtainable from W L Gore & Associates, fluorinated ethylene-propylene copolymer (FEP), or polyvinylchloride (PVC).

Each conducting element may comprise a single member, or may comprise a plurality of members, for example a liner may accommodate a quad, that is the conducting element may comprise two pairs of electrical conductors.

Preferably also, the cable includes load-bearing reinforcing elements. Typically, the cable will include a central load-bearing core, and may be provided with an outer sheathing of load-bearing elements. The load-bearing core and sheathing elements may be a synthetic or natural strength member and may comprise a fibrous material. The load-bearing core and sheathing elements may be of: aramid fibre, for example KEVLAR® fibre available from DuPont; stainless steel wire; polyamide fibres, such as nylon fibres; or ePTFE fibres such as RASTEX® fibres obtainable from W L Gore & Associates in Putzbrunn, Germany. These elements may be impregnated with materials which are bondable to the matrix material.

According to another aspect of the present invention there is provided a method of forming a non-rigid cable which is bendable in multiple planes, the method comprising setting a plurality of elongate elements in spaced relation within a settable matrix-forming material, and permitting the material to set so that the elements are spaced from one another within the cable by a stress-bearing matrix substantially throughout the length of the cable.

Preferably, the cable is formed by a method including the following steps:
forming a core of said matrix-forming material;
laying elongate elements in circumferentially spaced relation on an outer surface of the core; and
applying matrix-forming material over the elements to form a sheath to cover the elements.

In one embodiment, the elongate elements are laid into the outer surface of the core before the core has set, such that the core surface deforms to accommodate the elements.

The matrix forming material may then be applied to fill any remaining spaces between the elements. The core surface may be subject to heating to prevent the material from setting prior to application of the elements. Of course the method of handling the core will be selected for compatibility with the matrix-forming material setting mechanism.

In the preferred embodiment, at least some of the elongate elements are provided with sheaths of matrix-forming material which merge with the other elements of matrix-forming material during processing. This method facilitates accurate placement of the elongate elements within the matrix, particularly when the sum of the diameters of the sheathed elongate elements is equivalent to the circumference of the cable at the centres of the elongate elements.

In a further embodiment, a single stage extrusion process is utilised to form the matrix in a single step. This may be achieved by utilising a multi-holed extruder tip and profiled die placed at the gathering point of a non-planetary cabler with a rotating take-up. Alternatively, the matrix is formed using a material which sets by means of a mechanism other than cooling, such as a two-part compound or a heat or UV-curable material.

Preferably also, the matrix-forming material is polyurethane, though of course any suitable material may be utilised, including thermoplastic rubber (TPR), polyester (PES); or polyolefins including polyethylene or polypropylene (PP). The core-forming material and sheath-forming materials are the same or similar and will bond to one another.

The modulus of the matrix-forming material may be selected to suit particular applications: a low modulus material would result in a more flexible cable but might not be suitable for use in cable experiencing high pressures and would not be well adapted to transfer load, whereas a higher modulus material would be less flexible but better adapted to withstand pressure and loads.

One or both of the core and the sheath may be extruded.

Preferably also, the matrix-forming material core is formed around a central load-bearing core. The provision of the stress-bearing matrix around the core allows forces applied externally to the cable, for example by a cable squirter, to be more evenly distributed around and effectively transferred to the load-bearing core.

As the elements are isolated from one another within the cable by the matrix, any forces applied or transferred to the elements result in the elements tending to move individually relative to the matrix, rather than as a single composite unit as in conventional cables. This has significant advantages where "takeouts" are provided in a cable, that is when an element, or a portion of an element, sometimes known as a "pig-tail", is pulled out of the cable for connection to a device, sensor and the like mounted on the cable. In conventional ocean bottom cables, the tendency for the conductor layer to move longitudinally as a unit relative to overlying sheaths increases the risk of the pig-tail being sheared due to movement between the elements and the overlying sheaths. In the present invention, the tendency for such movement is substantially reduced, and as elements will tend to move individually within the cable any movement will follow the helical path of the respective element, substantially reducing the risk of shearing. One practical consequence of this is that the window which is cut in the cable sheath to form the take out may be relatively small in cables according to embodiments of the present invention, as described below.

In conventional cables, the window which is cut in the outer sheath or jacket is generally of the same dimensions as the pig-tail, thus a 7.5 cm pig-tail will result in a 7.5 cm window being cut in the cable sheath or jacket. This will result in the outer reinforcing fibres, typically KEVLAR braid, being cut through at a number of points, weakening the cable. In embodiments of the present invention, the provision of element isolated and spaced apart by the matrix, and also the use of transparent sheathing, allows an operator to form a pig-tail by cutting or drilling two relatively small holes to intersect the selected element, cutting the element at one hole and then pulling the cut tail of the element through the other hole. It will normally be possible to cut the holes without damaging the outer reinforcing fibres and weakening the cables, and to pull the element from the matrix without sustaining damage.

According to a further aspect of the invention there is provided a combination of a cable and a device comprising: a cable with an outer surface and having a stress-bearing matrix extending substantially through the length of the cable, a plurality of conducting elements each extending in a path substantially through the length of the cable and being located within and spaced from one another by said stress-bearing matrix, at least one hole being cut from the outer surface of the cable to a point within said stress-bearing matrix and intersecting the path of at least one of the plurality of conducting elements; wherein at least one of the plurality of conducting elements extends through said at least one hole and is connected to the device.

According to another aspect of the present invention there is provided a method of providing a take out in a cable comprising at least one elongate element extending along a path through the body of the cable and contained within a sheath, the method comprising:

cutting holes at two points in the sheath, the holes intersecting the path of the element;

cutting the element at one hole to form a tail; and pulling the tail through the other hole.

Preferably, the element is movable relative to the body of the cable and is most preferably provided within a low-friction liner.

Preferably also, the overlying matrix material is selected to be transparent, such that the location of the element and any sensitive overlying elements (for example reinforcing fibres, adjacent elements and the like) within the body of the cable may be ascertained by visual inspection.

BRIEF DESCRIPTION OF THE DRAWINGS

These and other aspects of the present invention will now be described, by way of example, with reference to the accompanying drawings, in which:

FIGS. 3 to 6 are diagrammatic sectional views of steps in a cable-forming process in accordance with an embodiment of the present invention;

FIG. 7 is a diagrammatic sectional view of a step in a cable-forming process in accordance with a preferred embodiment of the present invention;

DETAILED DESCRIPTION OF THE DRAWINGS

Figure 1:
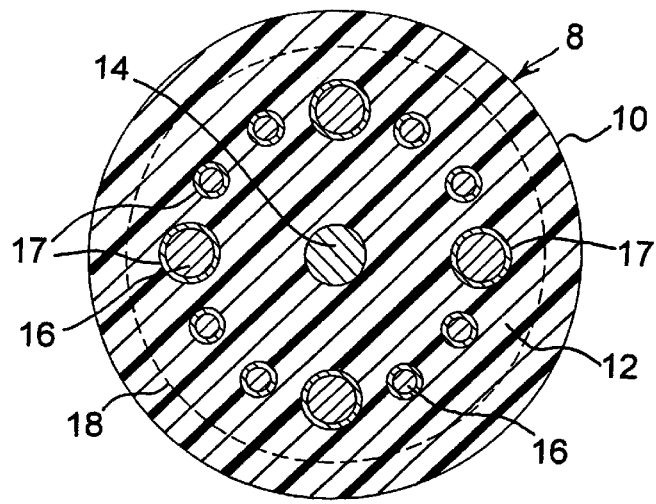
FIG. 1 is a diagrammatic sectional view of a cable in accordance with an embodiment of the present invention.
Figure 2:
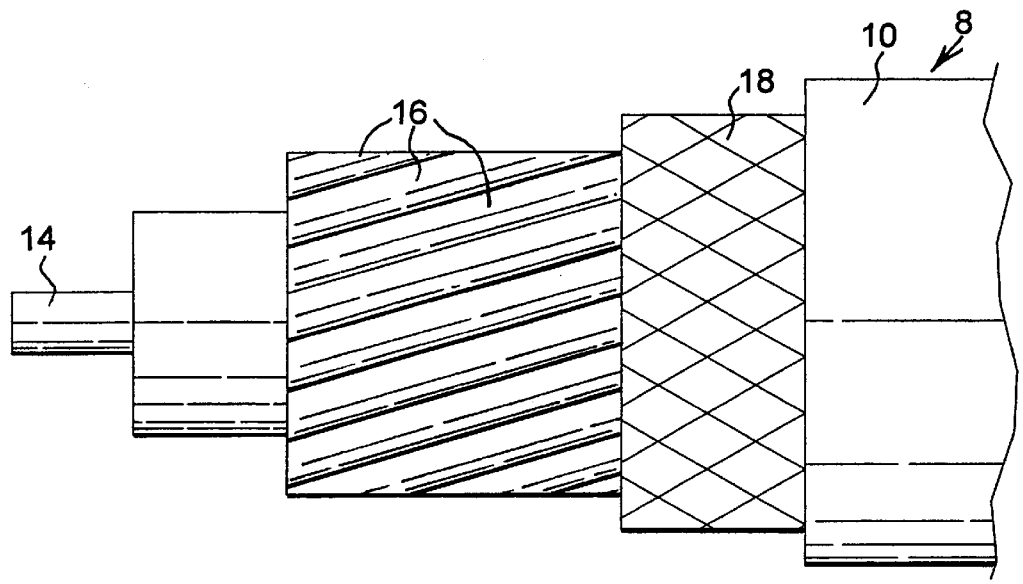
FIG. 2 is a cut-away side view of a section of the cable of FIG. 1.

Reference is first made to FIGS. 1 and 2 of the drawings, which illustrate a cable 8 in accordance with an embodiment of the present invention. The cable 8 comprises an outer sheath or jacket 10, a continuous load-bearing polyurethane matrix 12 extending throughout the length of the cable and within which are set: a load-bearing central aramid fibre core 14; a plurality of helically wound elongate elements in the form of insulated conductors 16; and outer aramid fibre reinforcement in the form of a braid 18.

The insulated conductors 16 and the core 14 are separated by the matrix 13, with the matrix extending between the insulated conductors 16. The insulated conductors 16 are contained within liners 17 and are movable relative to the liners 17.

Steps in forming at least the inner portion of the cable 10 are illustrated in FIGS. 3 through 6 of the drawings. The load-bearing fibrous core 14 (FIG. 3) is passed through an extrusion die and a core 22 of matrix-forming material 25 extruded over the fibrous core 14 (FIG. 4). On passing from the die, the core 22 is retained at an elevated temperature by appropriate heaters. The heated core 22 is then passed through a cabling station, where the insulated conductors 16, in their liners 17, are pressed into the hot outer surface of the core 22. The outer surface of the core 22 deforms to accommodate the insulated conductors 16 to form core 26 (FIG. 5). The core 26 is then passed through a further extrusion die, where a sheath of matrix-forming material 24 is extruded over the core 26, the material 24 moving into the spaces between the insulated conductors 16 to bond with the core material 22. The core material 22 and sheath material 24 are then permitted to set, in the process bonding to form the homogeneous matrix 12 and a core 28 (FIG. 6). Other layers of material, such as the outer fibre reinforcement 18 and\or overlying jackets 10 may subsequently be applied over the core 28. The outer jackets 10 and the materials 24 and 25 which make up matrix 12 are of the same or similar materials which are bondable with one another, preferably polyurethane.

Reference is now made to FIG. 7 of the drawings, which illustrates a step in an alternative, and preferred, method of forming the inner portion of a cable in accordance with the present invention. In this method, the heated core 122 is passed through a cabling station, where heated conductors 116, provided with ePTFE liners 117 and thicker polyurethane sleeves 119, are pressed into the soft outer surface of the core 122. A sheath of matrix-forming material is subsequently extruded over the sheathed conductors 116. The method is preferred as it facilitates location of the conductors 116 around the core 122: the sum of the diameters of the sheathed conductors 116 is approximately equivalent to the desired circumference of the cable at the centres of the conductors.

In a further embodiment, a single stage extrusion may be utilised, to form the matrix 12 in a single step. This may be achieved by utilising a multi-holed tip and profiled die placed at the gathering point of a non-planetary cabler with a rotating take-up.

In a still further embodiment the matrix is formed of a two-part polyurethane compound. The compound may be injected onto polyurethane-sheathed components at a crosshead located at the gathering point of a cabler. If required, a polyurethane binder may then be bound around the cable to hold the matrix-forming material in place while the polyurethane compound sets.

Figure 8:
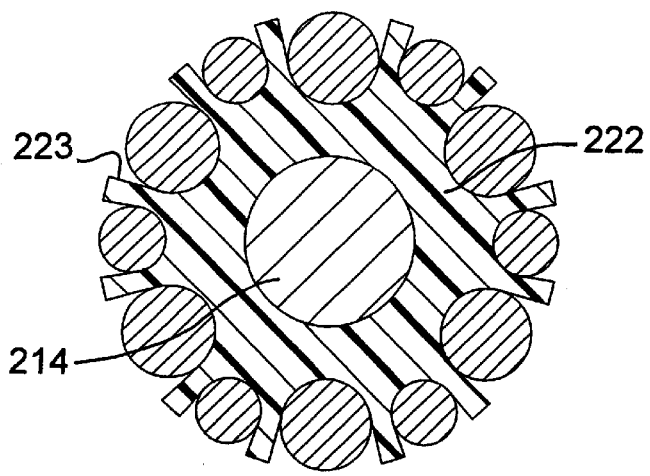
FIGS. 8 to 10 are diagrammatic sectional views of steps in a cable-forming process in accordance with another embodiment of the present invention.
Figure 9:
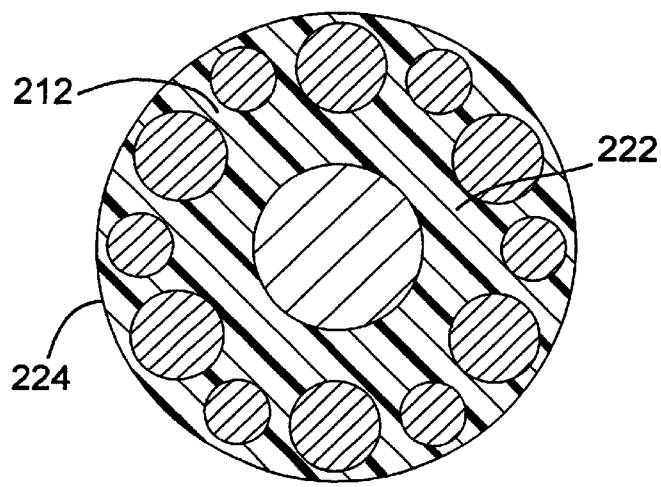
Figure 10:
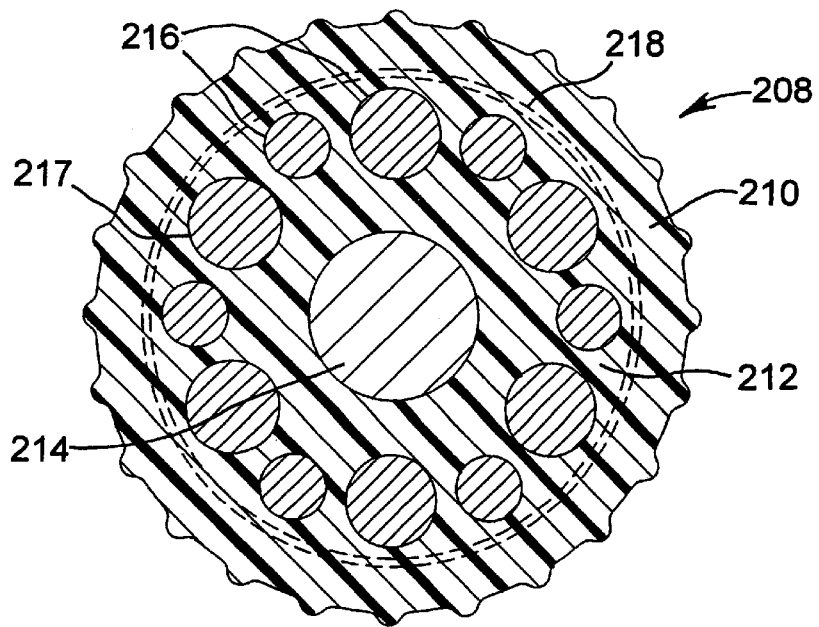

Reference is now made to FIGS. 8, 9 and 10 of the drawings, which illustrate steps in a cable-forming process in accordance with another embodiment of the present invention, In this example, the cable 208 comprises an outer jacket 210, a stress-bearing polyurethane matrix 212 extending through the length of the cable and within which are retained: a load-bearing central aramid fibre core or strength member 214; a plurality of conducting elements in the form of power and sensor quads 216 (that is each element contains two pairs of conductors); and outer braided aramid strength members 218.

The quads 216 are contained within close-fitting low friction ePTFE liners 217 such that the quads 216 are longitudinally movable relative to the matrix 212.

The Figures illustrate steps in the formation of the cable 208, FIG. 8 showing the cable construction after a starshaped core 222 of polyurethane has been extruded onto the central strength member 214, and the quads 216 laid in the grooves 223 defined in the surface of the core 222. The grooves 223 may extend helically to facilitate bending of the cable, or may extend axially. A inner "jacket" 224 of polyurethane material is then pressure extruded over the core 222 and quads 216 to fill the grooves, as illustrated in FIG. 9, the core 222 and jacket 224 setting and bonding to form the substantially homogeneous matrix 212. The braiding 218 is then applied and the outer jacket 210 extruded onto the matrix 212, the finished cable being illustrated in FIG. 10.

This embodiment provides improved component isolation, and the location of the components in the matrix 212 provides excellent load transfer from the outer jacket 210 to the central strength member 214.

Figure 11:
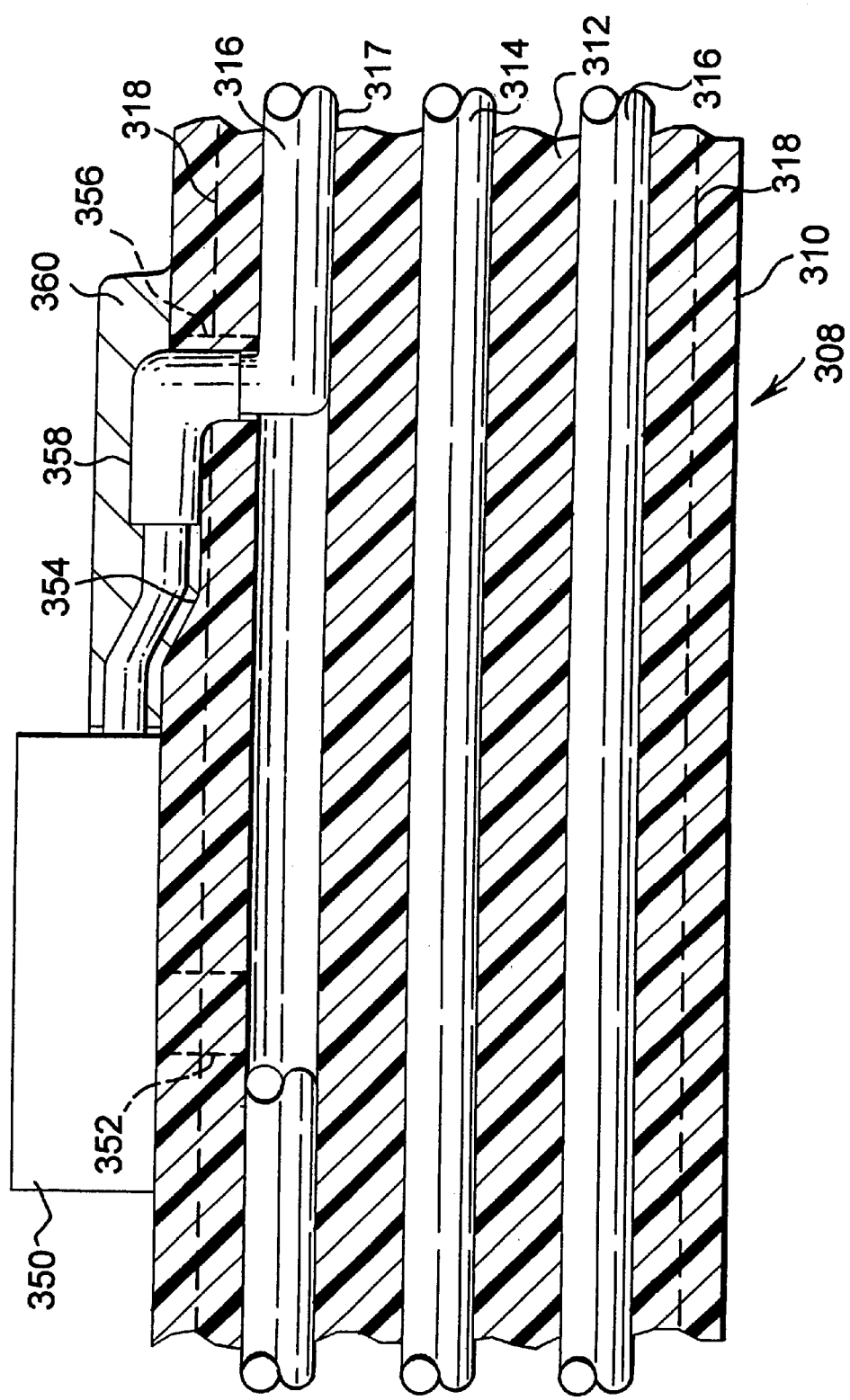
FIG. 11 is a diagrammatic longitudinal sectional view of a combination of a cable and a sensor in accordance with an embodiment of another aspect of the present invention.

Reference is now made to FIG. 11 of the drawings, which is a diagrammatic longitudinal sectional view of a combination of a cable and a sensor in accordance with an embodiment of another aspect of the present invention. The cable 308 is of similar construction to the cables described above, comprising a transparent polyurethane outer jacket 310, a stress-bearing polyurethane matrix 312, a central strength member 314, a plurality of helically wound quads 316, and outer reinforcing aramid braid 318. The quads 316 are contained within close-fitting low friction ePTFE liners 317 such that the quads 316 are longitudinally movable relative to the matrix 312.

One of the quads 316 is shown extending through the jacket 310 and braid 318 to connect to a device, in the form of a sensor 350, mounted on the cable 308. The illustrated arrangement is utilised for mounting sensors on OBC and the method of forming the "take out" to allow the formation of a connection between the cable 308 and the sensor 350 is described below.

As the jacket 310 is transparent, the quads 316 are visible within the cable 308, allowing an operator to visually locate a required quad 316; in the region where the sensor 350 is to be located on the cable 308, the operator then identifies a point along the length of the required quad 316 where the overlying aramid braid 318 does not obstruct access to the quad 316. Using a hot (around 250° C.) iron with a blunt tip, the operator then bores through the jacket 310 down to the quad 316, taking care not to damage or expose any of the braid 318. The exposed quad 316 is then hooked with a tool, care being taken not to nick neighbouring components. The quad 316 is then pulled through the hole 352 formed in the jacket 310 and cut with suitable pair of cutters, ensuring that all components of the quad 316 are cut, including, in this example, an aramid strength member and the low friction ePTFE binder 317. The operator then visually locates a point along the quad 316 approximately 10 cm (four inches) from the cut point in the direction of the cable end connector in which the overlying braid 318 does not obstruct access to the quad 316. Using the round shaft of the hot iron, the operator then burns a trough 354 in the jacket 310 parallel and above the quad 316 down to just above the aramid braid 318, and then, with the blunt tip of the iron, bores through the outer jacket 310 down to the quad 316. Any excess polyurethane is trimmed away, and the trough 354 tapered into the hole 356, again care being taken not to damage or expose any of the braid 318.

The loose end or tail of the quad 316 is then slowly pulled through the hole 356. If the ePTFE binder 317 is damaged, the base of the exposed tail is taped with PTFE pipe tape. A short PTFE tube 358 is then slid over the quad 316 and inserted into the hole 356. The polyurethane in the area around the base of the tube 358 is then heated with the side of the hot iron and polyurethane-based adhesive applied with a hot melt gun. The free end of the tube 358 is then laid in the trough 354 and adhesive applied from the hot melt gun over the top and sides of the tube 358 to secure the tube 358 to the cable 308. The hot iron and hot melt gun are then utilised to patch the quad cut hole 352.

The quad 316 is then terminated as described below (but which level of detail is not shown in the Figure). The quad strength member is tied to an anchor and the anchor attached to the cable with hot melt adhesive such that the strength member exito directly out of the tube 358. A service loop is then constructed, by threading approximately 5 cm (two inches) of the quad 316 into the tube 358 such that it forms an S-bend inside the tube 358, and sealing the end of the tube 358 with hot melt adhesive. The quad is then terminated, by slipping a boot seal over each of the individual quad wires and, with a connector locking ring in place, soldering each wire into an appropriate solder cup. Once the solder joints have been cleaned of flux, the boot seals slid down over the solder cups.

Following cleaning of the area around the takeout, a mould is placed around the takeout and natural polyurethane 360 injected into the mould. On the polyurethane setting, the mould is removed and any excess polyurethane flash removed. The sensor 350 may then be connected to the quad 316 and secured to the cable 308.

In contrast to existing takeouts, the cables of the present invention permit a takeout to be formed by only removing or forming two small holes on the cable jacket, and without damaging the reinforcing braid. Further, in the present invention, the holes may be resealed, unlike takeouts in existing cables in which a large cutout must be retained to accommodate the relative movement which occurs between the individual conductors and the outer cable jacket.

As will be apparent to those of skill in the art, the composition of the cables described above offer numerous advantages over the prior art cables, including: enhanced ability to transfer longitudinal or shear forces radially through the cable to the load bearing elements; increased resistance to radial compression, whether resulting from fluid pressure or mechanical pressure; absence of contact and abrasion between the elements; and greater isolation of the conductors from forces applied to the cable, thereby retaining flexibility throughout the cable. In addition, problems associated with the movement of component layers relative to overlaying layers, such as those encountered in the construction of takeouts and as specifically discussed above, are obviated. The cable also remains flexible and bendable in multiple planes, facilitating handling and increasing the number of dynamic applications in which the cable may be utilised.

Although flexible, the matrix will not tend to deform to any great extent when subject to stress, particularly under longitudinal or shear stresses. Thus, the matrix may transfer forces applied to the exterior of the cables by a squirter to the load-bearing core without substantial deformation, mitigating disruption to the internal cable configuration and damage to the conductors.

It will be clear to those of skill in the art that the above-described embodiments are merely exemplary of the invention, and that various modifications and improvements may be made thereto, without departing from the scope of the present invention. For example, in other embodiments the elongate elements may include optical fibres, force transmission cables or fluid conduits and the liners may be omitted or modified such that there is a predetermined transfer of forces from the matrix to selected elongate elements, which may be useful in reinforcing the cable.

What is claimed is:

1. A cable comprising: a stress-bearing matrix extending substantially through the length of the cable; and a plurality of conducting elements extending substantially through the length of the cable, said plurality of conducting elements being located within and spaced from one another by said stress-bearing matrix, wherein at least one of the plurality of conducting elements is in intimate contact with a low friction liner disposed about the at least one of the plurality of conducting elements and at least one of the conducting elements is longitudinally movable relative to the stress-bearing matrix.

2. The cable of claim 1, wherein said low friction liner is of expanded polytetrafluoroethylene (ePTFE).

3. The cable of claim 1, wherein said low friction liner is of a fluorocarbon material such as PTFE, FEP, or PFA; silicons; graphites; talcs; polyethylenes; polypropylenes; EPC; polyesters; or the like.

4. The cable of claim 1, wherein said low friction liner is of a material which is not bondable to the material forming the matrix.

5. The cable of claim 1, wherein the conducting elements are helically wound.

6. The cable of claim 1, wherein at least one of the conducting elements is an electrical conductor.

7. The cable of claim 1, wherein at least one of the conducting elements is an optical fibre.

8. The cable of claim 1, wherein at least one of the conducting elements is a force transmission member.

9. The cable of claim 1, wherein at least one of the conducting elements is a fluid conduit.

10. The cable of claim 1, wherein the matrix fills substantially all of the space between the conducting elements.

11. The cable of claim 1, wherein the cable further comprises load-bearing reinforcing elements.

12. The cable of claim 1, wherein the cable further comprises load-bearing fibrous reinforcing elements.

13. The cable of claim 1, wherein the cable further comprises a central load-bearing core.

14. A method of forming a cable comprising:
   forming a core of matrix-forming material having an outer surface;
   laying elongate elements in circumferentially spaced relation into said outer surface of said core; and
   wherein at least one of said elongate elements is located within a low friction liner; and
   wherein at least one of said elongate elements and said low friction liner is provided with a sleeve of material bondable to the matrix-forming material;
   applying matrix-forming over the elements, low friction liners, and sleeves to form a sheath which bonds to the sleeves.

15. The method of claim 14, wherein said low friction liner is bound around the element.

16. The method of claim 14, wherein the elongate elements are laid into the outer surface of the core before the core has set, such that the core surface deforms to accommodate the elements.

17. The method of claim 14, wherein the core surface is subject to heating to prevent the material from setting prior to application of the elements.

18. The method of claim 14, wherein the core-forming and sheath forming materials are the same or similar.

19. The method of claim 14, wherein at least one of the core and the sheath is extruded.

20. The method of claim 14, wherein the matrix-forming material core is formed around a central load-bearing core.

21. The method of claim 14, wherein the matrix-forming material is polyurethane.

22. The method of claim 14, wherein the matrix-forming material is applied around the elongate elements in a single extrusion step.

23. The method of claim 14, wherein the matrix-forming material is a two-part compound.

24. The method of claim 23, wherein the matrix-forming material is injected onto the elongate elements during cabling.

25. The method of claim 23, wherein a binder or jacket is bound around the cable to hold the matrix-forming material in position at least until it has set.

26. The method of claim 25, wherein said binder or jacket bonds to the matrix-forming material.

27. A cable as defined in claim 1 wherein at least one of said conducting elements is longitudinally movable relative to said low friction liner.

* * * * *